(12) United States Patent
Hill et al.

(10) Patent No.: US 8,321,130 B2
(45) Date of Patent: Nov. 27, 2012

(54) SELECTING AND ANNOTATING WELL LOGS

(75) Inventors: Carolyn Hill, Calgary (CA); Robert Michael Banks, Calgary (CA); Annette Louise deJong, Calgary (CA); Richard Eli Herrmann, Morrison, CO (US)

(73) Assignee: IHS Inc., Englewood, CO (US)

( * ) Notice: Subject to any disclaimer, the term of this patent is extended or adjusted under 35 U.S.C. 154(b) by 284 days.

(21) Appl. No.: 12/628,145

(22) Filed: Nov. 30, 2009

(65) Prior Publication Data

US 2011/0131232 A1 Jun. 2, 2011

(51) Int. Cl.
*G06F 19/00* (2006.01)
*G01V 1/00* (2006.01)
*G06F 17/30* (2006.01)

(52) U.S. Cl. ................... 702/6; 702/16; 707/769

(58) Field of Classification Search .............. None
See application file for complete search history.

(56) References Cited

U.S. PATENT DOCUMENTS

2006/0052937 A1* 3/2006 Zoraster et al. ............... 702/6
2007/0061079 A1* 3/2007 Hu ................................ 702/6

* cited by examiner

*Primary Examiner* — Pierre Vital
*Assistant Examiner* — Berhanu Mitiku
(74) *Attorney, Agent, or Firm* — Blakely Sokoloff Taylor & Zafman LLP

(57) ABSTRACT

Well logs are selected, annotated and correlated. In one example, a display of a well log showing logged information and well depths corresponding to the information is presented. Data related to the well log is searched to find a named formation near a selected depth and a name of a formation near the named formation is selected. The selected adjacent formation name is then presented on the display of the well log in association with the displayed depth.

16 Claims, 13 Drawing Sheets

100
SELECTING AND ANNOTATING WELL LOGS

FIELD

The present description relates to the field of evaluating well logs for geological analysis and exploration and, in particular, to selecting and comparing well logs using automated tools.

BACKGROUND

Geological and geophysical modeling tools allow a user to select a line of wells (usually referred to as a Cross-section) and then to mark characteristics or pick formation TOPS. These modeling tools are used by the energy and natural resource conservation and development enterprises to characterize wells and make predictions about available reserves.

Without automated tools, earth scientists start with a paper well log and pin it to a board. The well log shows measurements of the well charted along its depth. A paper well log is printed on a long roll of paper with several different parameters charted down the length of the paper. The parameters are aligned by depth so that at any one depth, the scientist can see values for each parameter together.

For comparison the earth scientist selects a log from any adjacent or nearby well and pins it next to the first well to compare characteristics of the two wells. Both paper logs can be marked and commented at interesting points for future reference. Another log can be selected from another well adjacent to the first well (but in a different direction) and the same kind of comparisons can be done.

From these manual methods, a workflow developed based on the concept of pinning a log. The first log is identified as being pinned to the board and then the other logs are compared to the pinned log. The comparisons to the pinned well happen for as many wells as are available near the first pinned well. If there is a second well that looks as though there is a formation of interest between it and the first pinned well, then the researcher can pin the second well's log to the board as the new reference. Comparisons can then work out radially or in any other direction from that well. In this manner, a geological formation can be followed at any depth through a line of wells that was not predetermined before the professional started working.

Automated tools for comparing logs have diverged from the traditional workflow and can be difficult to use. A further problem for automated tools is in supporting the comparisons. Many of the comparisons involve marking and commenting individual formations through which the well log passes. When an earth scientist selects a well and clicks on a log image or a particular data curve on a log, it is often to mark a depth or indicate a new formation top. While the depths are typically well marked, there can be many different tops to pick for each well, and there can be many wells. Choosing names of tops or formations from a list is helpful but the lists can become cumbersome as well.

Choosing names of tops to associate with a well becomes easier, if there is a list of formations set up initially. While this can make it somewhat easier to pick tops using the list, establishing the list can be cumbersome and ordering the list can be worse. Formations do not always occur in the same order in every well and there can be many different formations through the entire depth of the well.

SUMMARY OF THE INVENTION

Well logs are selected, annotated and correlated. In one example, a display of a well log showing logged information and well depths corresponding to the information is presented. Data related to the well log is searched to find a named formation near a selected depth and a name of a formation near the named formation is selected. The selected adjacent formation name is then presented on the display of the well log in association with the displayed depth.

BRIEF DESCRIPTION OF THE SEVERAL VIEWS OF THE DRAWINGS

The appended claims set forth the features of the invention with particularity. The present invention is illustrated by way of example, and not by way of limitation, in the figures of the accompanying drawings in which like reference numerals refer to similar elements and in which:

DETAILED DESCRIPTION

Figure 1:
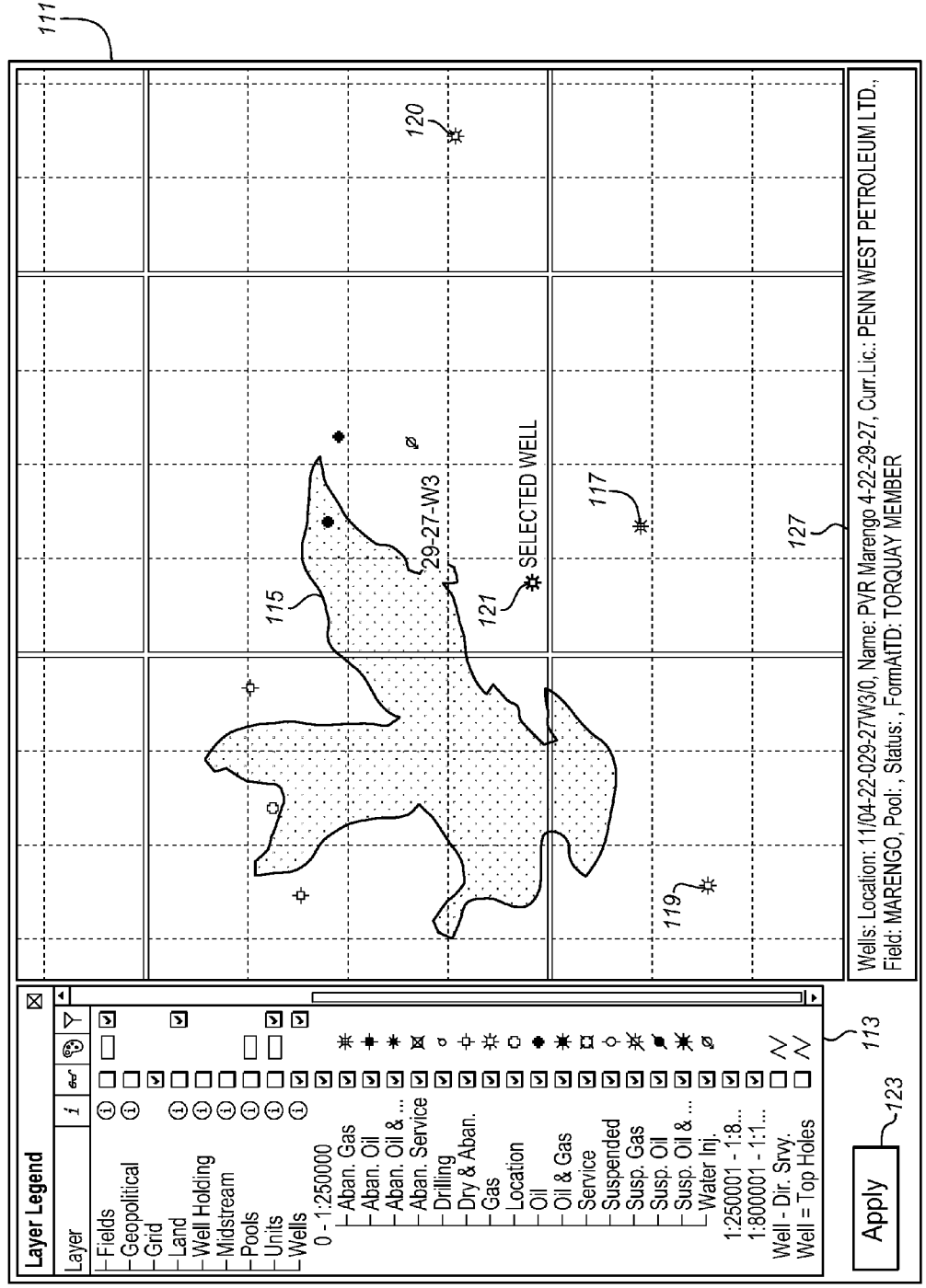
FIG. 1 is an example of a map of a well field as displayed on a computer system with a first well selected according to an embodiment of the invention.

The examination of wells and well logs through formations can be made easier using automated tools. However, automated tools that are well adapted to an efficient workflow provide more efficiency and greater ease.

In one example, a user selects a well (well 1) from a map window by clicking to select it. A right-mouse-click can be used to send the log for well 1 to a "correlation" window. Another right-mouse-click can be used to pin the log in place in the correlation window. Using multiple windows the user can switch back to the map window to select a second well (well 2) by clicking on it on the map. Its image and its log then appears alongside the first well (well 1) in the correlate window.

In the correlate window, comparisons, comments, marking can all be done as in a traditional workflow. The user can also "float" the second log over the first, if necessary, to line up interesting areas. This makes comparisons easier, and makes it easier to mark both logs electronically at different depths at the same time. The application can keep track of these marks automatically, until the user decides to formally name the marks. These marks can persist between user sessions and when looking at different logs.

When finished comparing the first two wells or at any other time, the user can return to the map window and select another well (well 3), in a different direction from well 2. Upon selection, its log image will replace the unpinned image (well 2) in the correlation window. The user can make more comparisons and add marks etc. The user can then click on another well (well 4) and it will replace the well 3 image. This can continue as needed. The user can also change the reference well from well 1 to another well. The log for well 1 can be unpinned and the well for a different log can be pinned in its place. This workflow allows an earth scientist to build a cross section without any restrictions in direction, depth or order.

A Correlate Module can be used to pick tops. After establishing a list of relevant formations in some picking order, an earth scientist can select a formation in the list. This can be done without regard to depth or position in the list or on a well log. When a user moves a mouse over a well log, he can indicate the mouse position as the top for a selected formation. By clicking a particular depth, the user can identify that depth as the top.

If the depth has already been associated with another formation top, then the name of the already identified top can be given instead. Picking the next top is made easier by automatically determining the next higher or lower top and providing that as a potential identification for the neighboring formation top. In other words, if the top closest to a mouse indicator is named, then the system assumes that a user would like to move on to picking a top for the next formation. By comparing the current mouse position to already existing tops, the system can determine if the next formation top to be added should be the formation above, or the formation below the currently selected formation in the pick list.

The identification of tops can be further aided by providing a prediction marker on the logs as the user moves his mouse around. The sample prediction marker can include formation name and connecting correlation lines that change as the next formation changes depending on the position of the mouse. The prediction markers can be used to indicate which top will be picked next when the user clicks his mouse button down.

Moving the mouse upwards, or downwards, or to the left, or to the right, can be used as an input for the system to determine and display formations in different directions from the current top and to indicate formations to which the next top is likely to belong. By allowing mouse movements in any direction and showing sample predictions that change with mouse movement, having to change the selection in the pick list can be largely avoided. The next formation is picked automatically.

Referring to the drawing figures, FIG. 1 is an example of a map of a well field as displayed on a computer system according to an embodiment of the invention. The display includes a map 111, and a layer legend 113. There may be other elements on the display to provide additional capabilities or information to a user. There may also be other elements associated with applications and operating systems, such as title bars, notification areas, menu selectors, hardware or program status indicators, etc. These are also not shown in order not to obscure the features of the invention.

The layer legend allows a user to select features of the map that are to be visible on the map. The features are in a variety of different categories and for wells, the features include oil wells, gas wells, and combined oil and gas wells. While only these types of wells are shown in FIG. 1, the invention is not limited to such wells, but can be applied to many different types of wells, including water, natural gas, methane, and other gases. The layer legend also indicates different symbols for the different types of wells and for wells of a different status. Accordingly, an abandoned gas well 117 is indicated on the map with a different symbol than an active gas well 119. In the layer legend, the user has selected for lakes to be displayed and accordingly, there is a lake 115 indicated on the map. By selecting different features to display, the user can tailor the view of the map to focus on features that are important to the viewer. Changing the views and clicking "Apply" 123 allows the user to compare different views.

The map also displays grid lines and identifying numbers for the grids, such as 29-27-W3. This grid is a part of the Canadian grid system applied the Western Provinces of Canada. The lines might alternatively show latitude and longitude, county, provincial and municipal boundaries, or any other geographical identifiers depending on the territory that is being displayed. For undersea wells in international or territorial waters, nautical references can be used.

In the example of FIG. 1, the user has selected a particular gas well 121. As a result, information about the well 127 is displayed in the lower margin including its name location, field, pool, etc. By selecting different wells, a user can easily learn names, and status of a variety of wells on the maps. By making a further selection, the user can command the system to retrieve a log for the well and post the log in a correlation window. The further command can be made in a variety of ways. With a mouse, a double click, right button click, or other command can be used. With other input devices, a wide range of different inputs can be used for selecting a well and for posting its log in a correlation window. In the case of some commands, a context menu can be displayed with several options, one of which can be to post the log on a correlation window.

Figure 2:
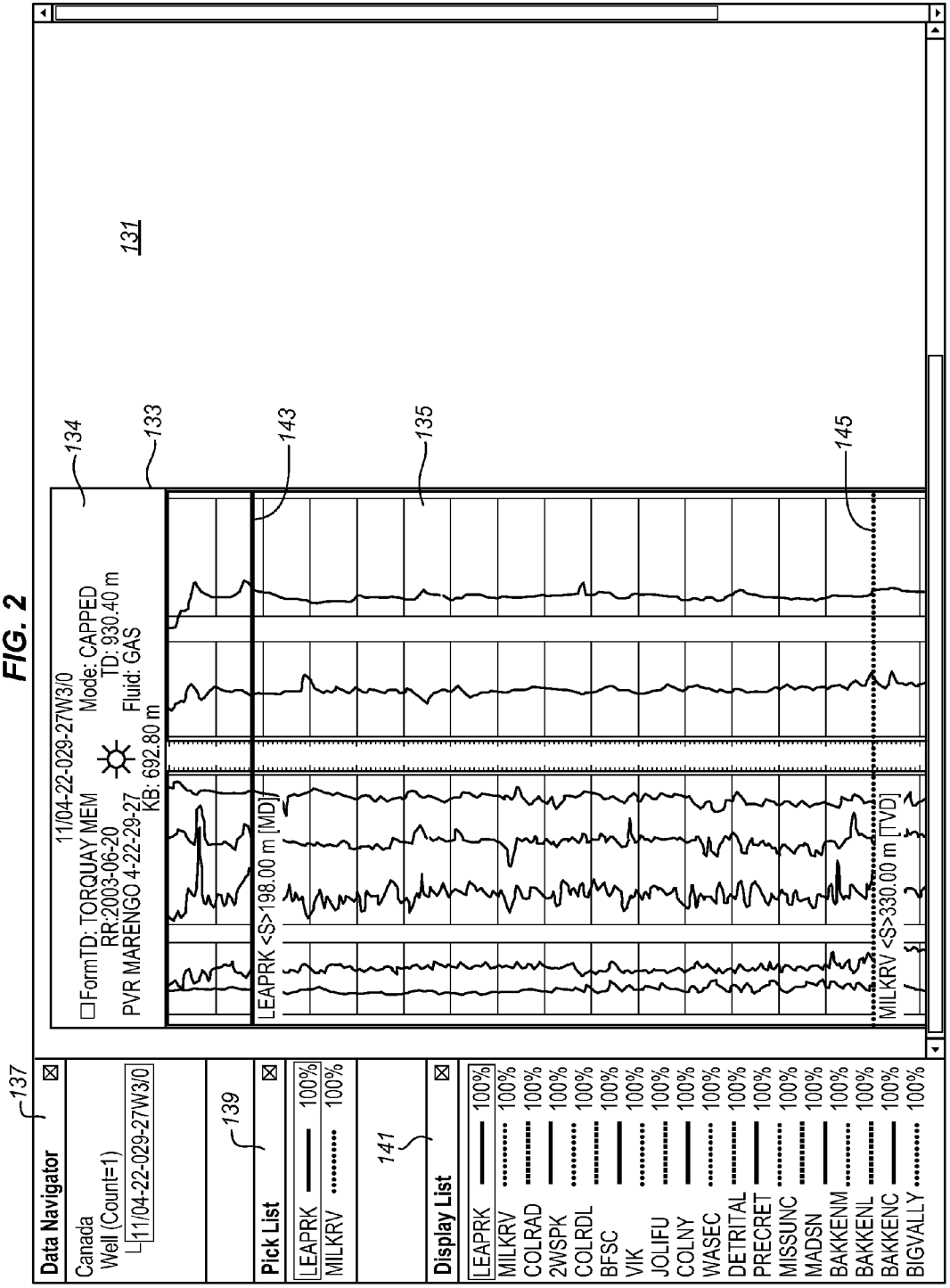
FIG. 2 is an example of a correlation window as displayed on a computer system according to an embodiment of the invention.

FIG. 2 shows a display of a correlation window 131 as it might appear on a computer system. As with FIG. 1 and the other diagrams of computer displays discussed and described herein, other elements of the display are not shown in order to avoid obscuring the invention. The illustrated portion of the display in FIG. 2 has a correlation window and a left hand side bar. This includes a data navigator 137 that shows the names of the selected wells. In this case, there is only one well selected. It has a pick list of formations 139, described below and it has a display list 141 of formations also described below.

In the correlation window, a log 133 for the selected well 121 is displayed. The log includes a title bar 134 showing the name and other identifying information about the well and also the logged data 135 for the selected well. It may be noted that the name of the selected gas well, 11/04-22-029-27W3/0, appears on the title bar and the data navigator and matches with the information window 127 at the bottom of FIG. 1. The logged data 135 shows values for different parameters of the well on a horizontal axis charted against the depth of the well on the vertical axis. In the illustrated example, seven different parameters of the well are charted against the depth of the well.

In addition to the charted parameters, the log also indicates the positions of formation tops in the well. In the illustrated example, two formation tops are indicated and they are named LEAPRK 143 at 198 m deep, and MILKRV 145 at 330 m deep. These formations are geological formations and can be used by an earth scientist or geologist to determine the locations of various material in the hole or in nearby holes. The two formations also appear in the pick list and the display list with an indication of the how they are displayed on the log. LEAPRK is displayed with a solid line, while MILKRV is displayed with a dotted line. While the formation tops do not appear at exactly the same depth in each well log, the depths are usually close for nearby wells. The order of the formations is also usually the same for nearby wells. With distance, the differences between wells increases and a formation that appears in one well may not appear at all in another well or it may be above or below another formation as compared to the first well.

Figure 3:
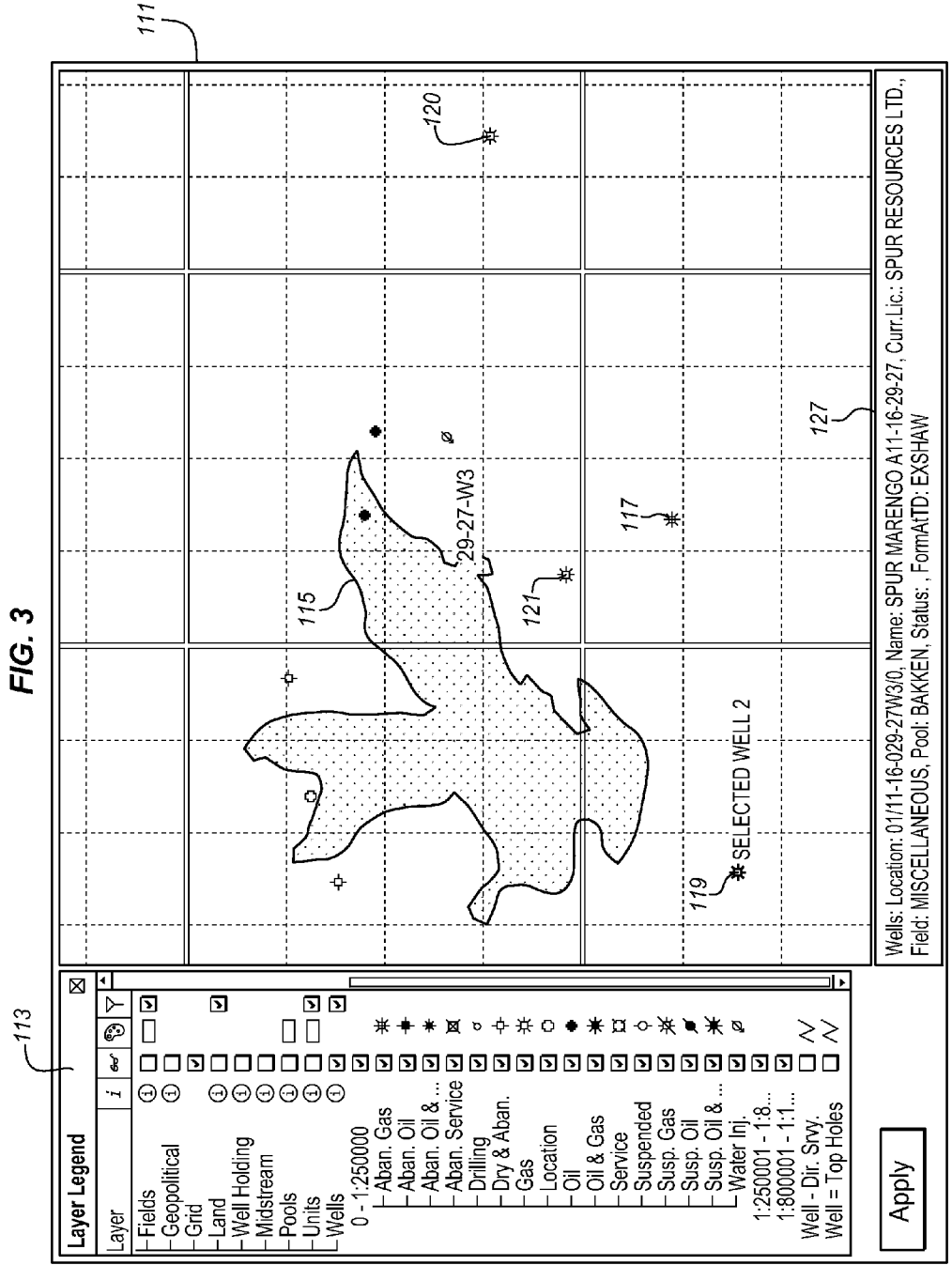
FIG. 3 is an example of a map of a well field as displayed on a computer system with a second well selected according to an embodiment of the invention.

Referring to FIG. 3, the same map of the same area on the grid as in FIG. 1 is displayed. In FIG. 3, the user has selected a different gas well 119 by hovering a cursor over it. Information about this well is accordingly displayed in the lower margin information window 127. By making a further selection, such as clicking or double clicking, or right clicking, the user can command the log for this well to be retrieved from a data store and displayed in the correlation window.

Figure 4:
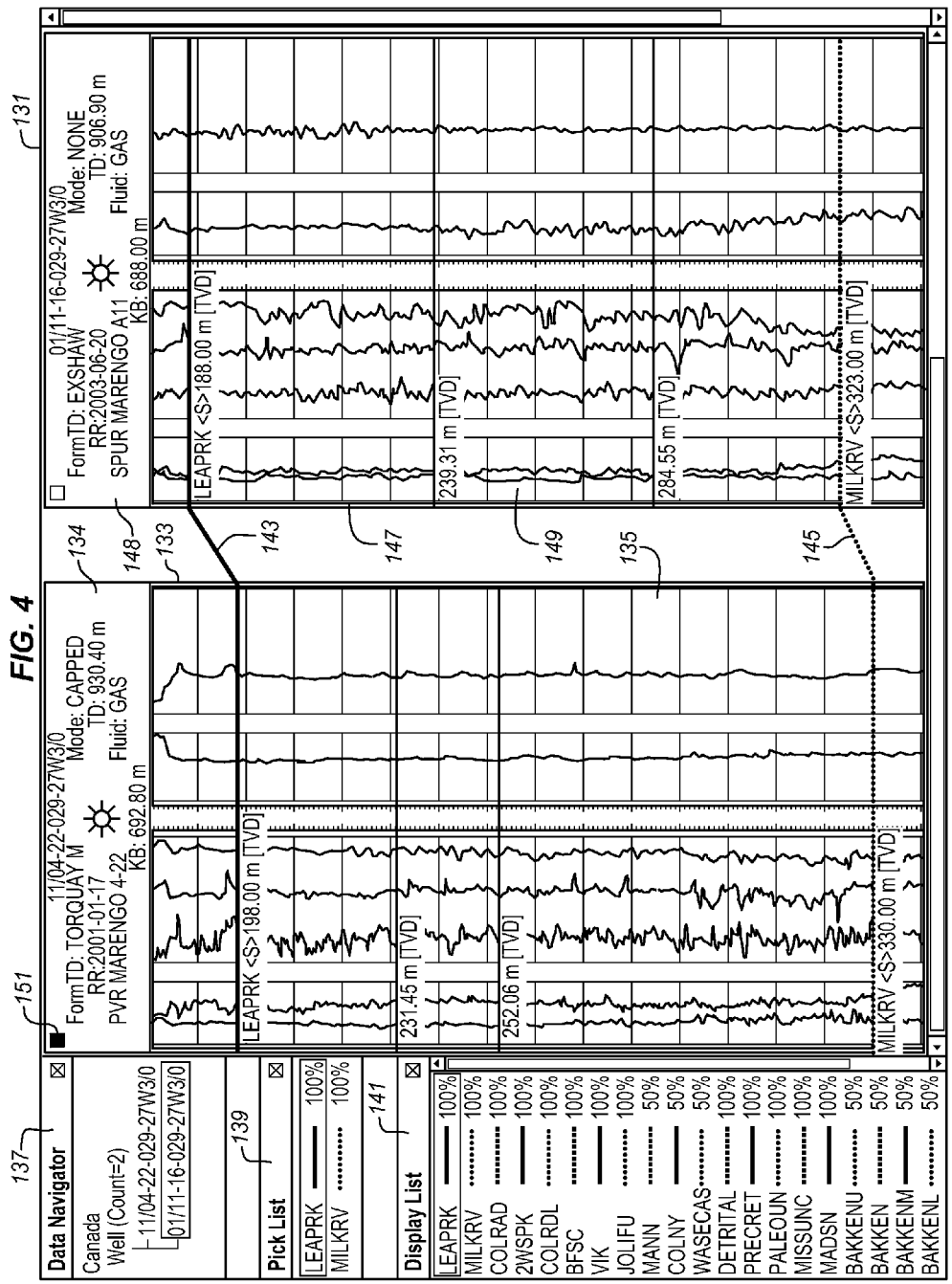
FIG. 4 is an example of a correlation window as displayed on a computer system with two logs displayed according to an embodiment of the invention.

FIG. 4 shows the correlation window 131 of FIG. 2 with logs 133, 147 for both selected wells displayed alongside one another. Like the first log, the second log has a title bar 148 and logged data 149. The two formations 143, 145 are also displayed. With both well logs, the formation can be displayed on both logs. The position of the logs can be manipulated by a user to line up the formations or to allow different depths to be displayed alongside one another. In one example, the user grabs one log and then moves it up or down to adjust its position relative to the other. This can be done by a click and drag mouse gesture or in a variety of other ways.

In the display of FIG. 4, both wells have a pin selection box 151. This allows the user to pin either one of the wells to the correlation window with single command. In the illustrated example, a well log is pinned by clicking the pin selection box. The user, at any time, can click the pin selection box for a different well to unpin the first well and pin the different well. The pinned well remains in the correlation window when another well is selected. This allow the geologist to establish one well as a reference and then to compare many different wells to that reference.

Figure 5:
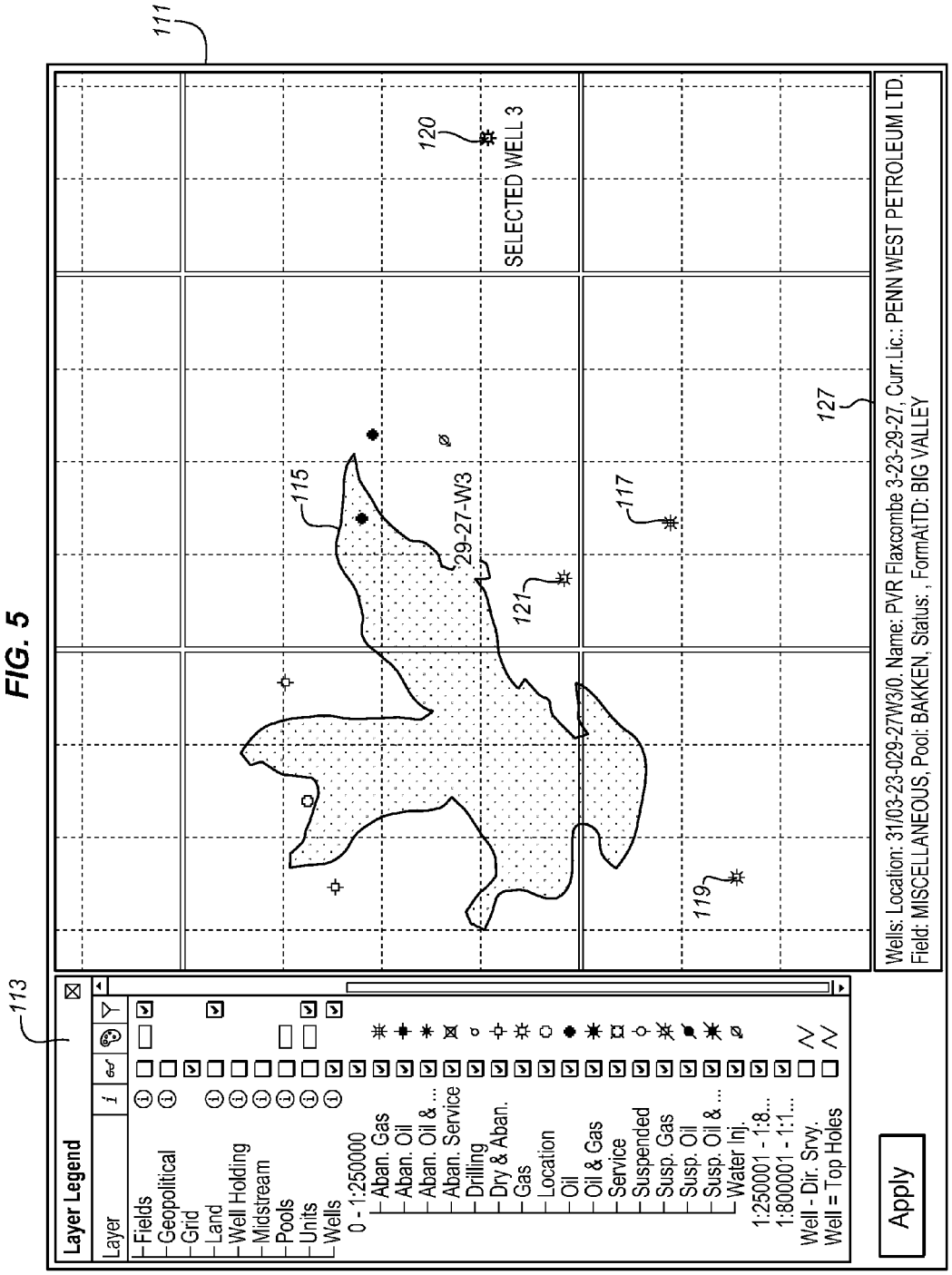
FIG. 5 is an example of a map of a well field as displayed on a computer system with a third well selected according to an embodiment of the invention.

FIG. 5 shows a display with the same map as with FIGS. 1 and 3. In the example of FIG. 5, a third gas well 120 has been selected and its information is displayed. The user can then select that well for display in the correlation window as shown in FIG. 6.

Figure 6:
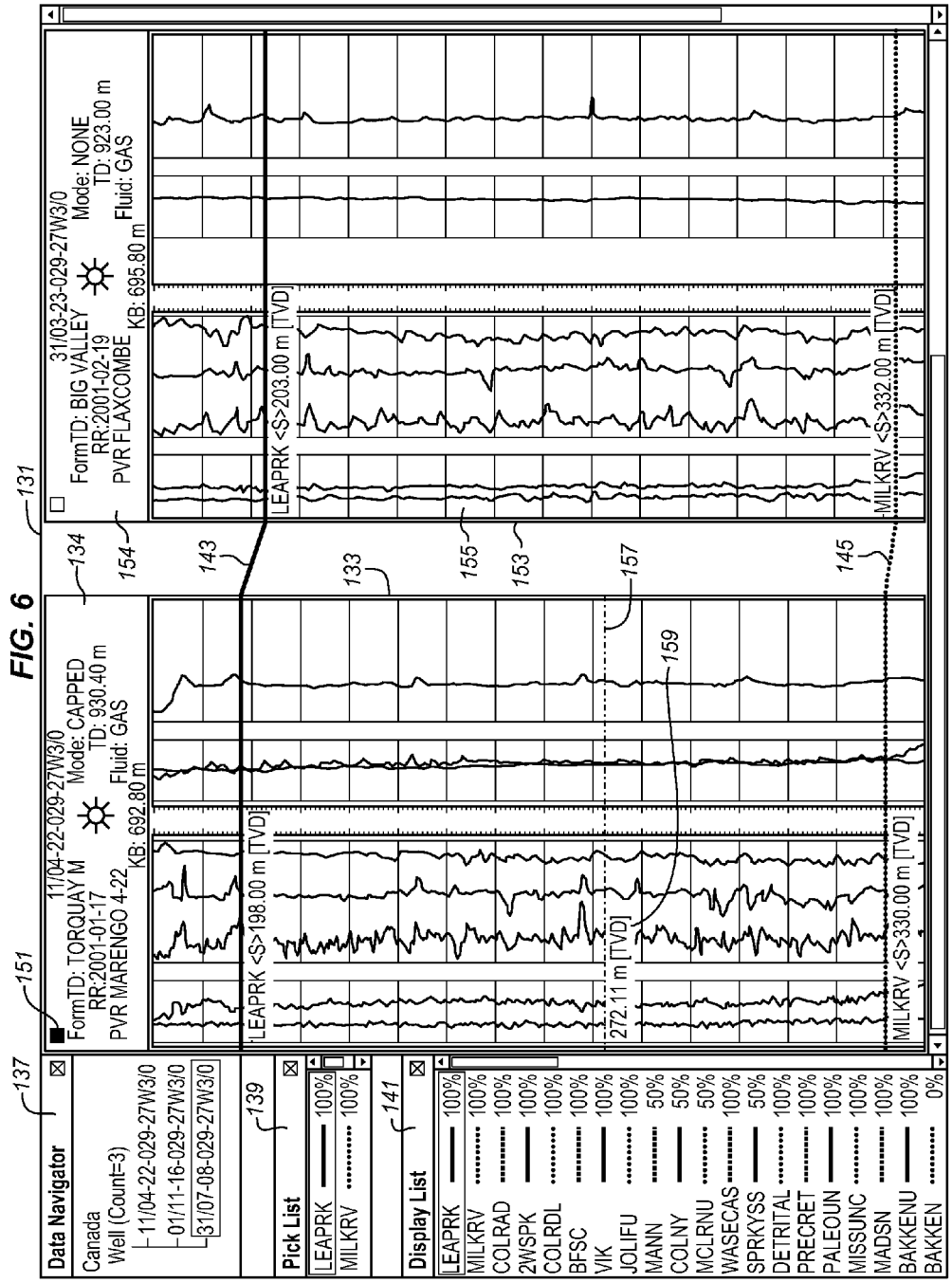
FIG. 6 is an example of a correlation window as displayed on a computer system with a third well displayed according to an embodiment of the invention.

In FIG. 6, the well 121 that was selected first has been pinned. Accordingly, its log 133 remains in the correlation window 131. The log 147 of the second selected well 119, however, has been replaced with a log 153 for the third selected well 120. As in the previous examples, this log has a title bar 154 identifying the well and logged data 155 showing the values for parameters of the well by depth. The two formations 143, 145 are also shown as they occur on both logs. Again, the logs are not vertically aligned, however the user can move the logs up or down with a simple command, for example a click and drag.

FIG. 6 illustrates how additional wells can be compared to a pinned well, simply by selecting from the map and posting another well to the correlation window. Any one of the wells can be selected from the map and the map display can be moved or navigated to show additional wells outside of the display area of FIGS. 1, 3, and 5. FIGS. 1, 3, and 5 also illustrate that the selected wells do not have any particular spatial relationship to each other on the map. Any well on the map, for which a log is available can be selected.

As a further alternative, FIG. 6 shows that the data navigator 137 lists all three of the selected wells. The user can switch the unpinned log between any one of the three listed wells simply by selecting one of the listed wells. All of the wells selected in a session will be listed in the data navigator. The user can clear the list to start a new session or delete any particular well from the list. These actions can be performed using a context menu or in a variety of other ways. A benefit of being able to select any one of the three wells is that the log for one well can be displayed twice in the correlation window. Using two displays of the same log, different depths of the same hole can be compared on the screen.

With the logs displayed, the geologist can also make annotations or comments on the logs. In the example of FIG. 6, the depth of 272.11 m has been marked 157. Such a mark can be made simply be selecting a particular depth. The system can then draw a line on the log at that depth. The mark can be added to the stored record of the log data or stored in a separate associated data file. The mark can also be annotated by adding descriptive text. In the illustrated example, the mark is annotated with [TVD] 159. The other two formations have been similarly annotated. These marks and annotations allow a geologist to make some notes and then refer back to them later. The marks can be moved and deleted and the annotation can also be edited and deleted. The results can then be saved in association with or as part of the logs.

While the figures show only two well logs in the correlation window, the correlation window can be expanded to include more than two wells. Three, four, or more well logs can be displayed alongside each other. In such an example, more than one well log can be pinned. In addition, well logs can be repositioned horizontally, so that the user can select which well logs in the correlation window are positioned next to which other logs. A variety of different commands can be used such as drag and click or swiping commands. With additional logs displayed, the interconnecting lines that cross the correlation window can span across many logs to show how formations line up in different wells.

Figure 7:
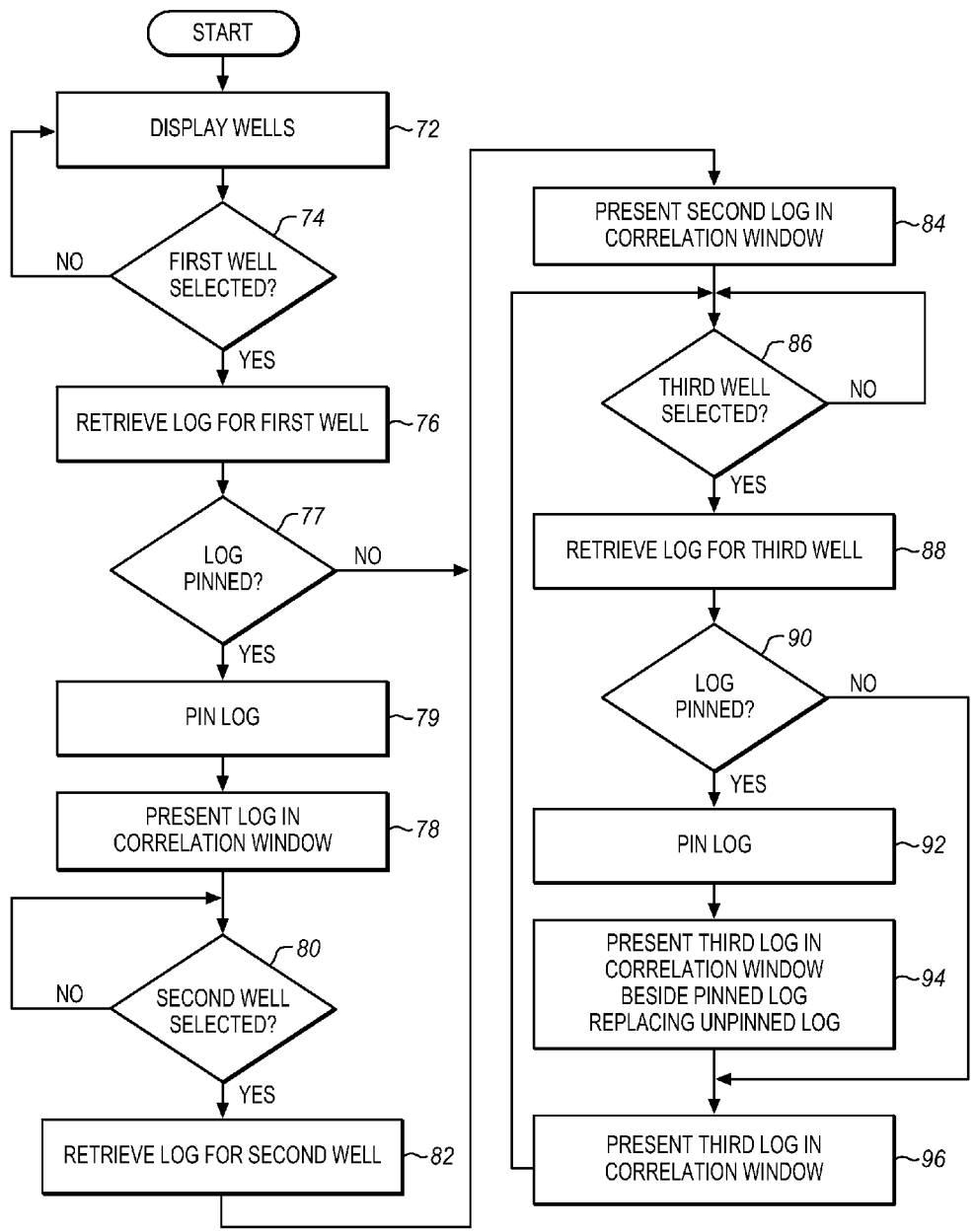
FIG. 7 is a flow diagram of selecting wells and displaying on a correlation window according to an embodiment of the invention.

Referring to FIG. 7, a flow chart of one example of the processes described above is shown. In the example of FIG. 7 after the well log data, maps and any other information has been analyzed, a display is presented at block 72 of the wells for which log data is available. This display can be presented in the map format of FIG. 1, in a list view, a grid view, or any of a variety of other presentations. The system then determines if one of the presented well has been selected at block 74. If not, then the system waits until a selection is made or until some other command is received to perform some other action.

At block 76, if a well has been selected, then its log is retrieved. At block 77, the system determines whether a user has commanded that one of the currently displayed logs be pinned. If so, then the system pins that log at block 79 and at block 78 the log is presented in the correlation window as shown by the example of FIG. 2. If no log has been pinned, then at block 78, the second log is displayed in the correlation window. A variety of other commands can be received as well upon, before, or after the selection of a well log.

At block 80, it is determined whether another well has been selected, for example by clicking a well on a map or a list or in any of a variety of other ways. If a second well has been selected, then at block 82, the log for that well is retrieved and at block 84 also displayed in the correlation window. If no second well is selected, the system waits for this or another command.

At block 86, the system waits for a third well to be selected. If a well is selected, then at block 88, the system retrieves log data for the third well. At block 90, the system determines whether a user has commanded that one of the currently displayed logs be pinned. If so, then the system pins that log at block 92 and at block 94 replaces the unpinned log with the newly selected log from block 86. If no log has been pinned, then at block 96, the third log is displayed in the correlation window. Any approach can be used to select which log to replace. The most recently selected, the earliest selected, the right side or left side log, or the log that corresponds to the farthest or closest well can be selected. The particular choice of which log to replace can be adapted to suit any particular environment. The process then returns to block 86 for another well to be selected.

The example of FIG. 7 is well adapted for the illustrated correlation window that displays two well logs. For a display of more logs, there may be more pinned logs, and the selection of another well may not result in a log display being replaced but in the new log display being added.

Embodiments of the present invention not only allow well logs to be placed side-by-side for comparison and study, but also allow formation tops to be identified, tagged, and correlated across logs. To mark formation tops, well logs are placed alongside each other in the correlation window. This can be done using the process of FIGS. 1 through 7 or any of a variety of other ways. In one example, starting with the map of FIG. 1, a user can select a context menu, for example with a right click, for each desired well that sends a log directly to the correlation window without affecting the map. In this way, several logs can be sent to the correlation window without moving from the map display.

Figure 8:
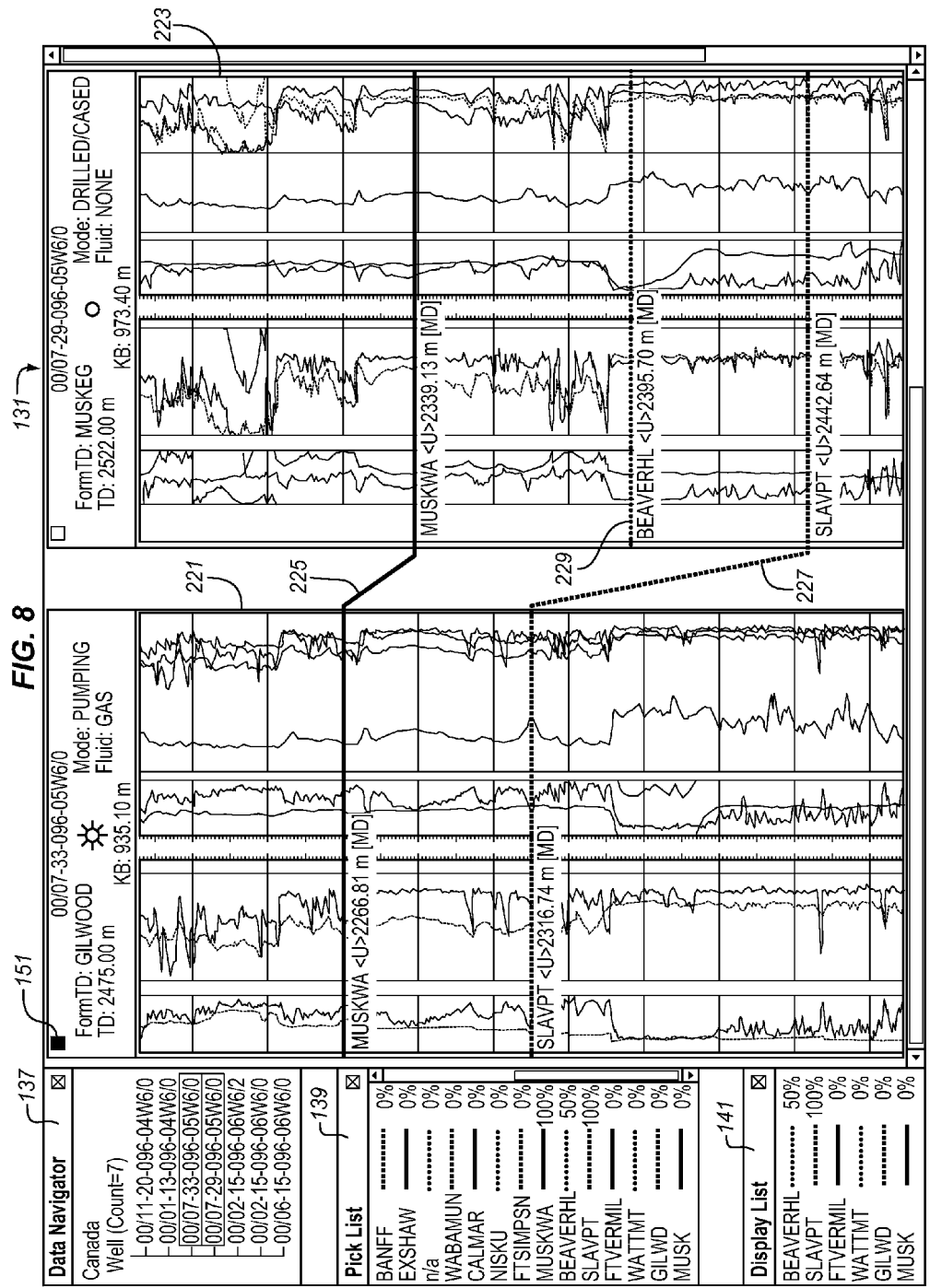
FIG. 8 is an example of a correlation window as displayed on a computer system with aligned formation tops according to an embodiment of the invention.

Referring to FIG. 8, a computer-generated display is shown that is particularly useful for picking well tops. As in FIG. 4, a first well log 221, corresponding to well 00/07-33-096-05W6/0 is pinned as indicated by the pin mark 151. A second well log 223 has been posted beside it corresponding to well 00/07-29-096-05W6/0. These two well logs are displayed in a correlation window 131. While two wells are shown for simplicity, more wells can be displayed alongside these two, depending upon the width of the display and the preferences of the user.

To the left side of the logs, a data navigator 137 allows the user to switch to any other previously selected wells. The data navigator shows seven previously selected wells by numerical name. Any other type of nomenclature may be used to identify the wells in the list. The names of the two displayed well logs are highlighted in the list for reference. The user can select a name whether it is highlighted or not. The log for the selected well will then replace the unpinned log or one of the unpinned logs. The user can pin that log by clicking the pin mark 151 for any particular log. Other wells can be added or swapped for the current wells by selecting them from the data navigator. If a well log that is not shown in the data navigator is desired, then the user can manually enter the name of the well, return to the map to select it, or select it in another way.

Below the data navigator 137, the display shows a pick list of formations 139. This pick list can be established by the user or generated automatically from data about the wells in the data navigator. The pick list can also be modified to include formations that have not been associated with the displayed well logs. This can be helpful when new formations are expected to be found in exploratory wells.

Below the pick list 139, the display list 141 shows all of the formations that are actually displayed on the displayed well logs. The display list includes formations not currently visible on the screen but which would be visible by scrolling the view up or down. The pick list typically includes only some of the formations in the display list. However, a user may be able to add additional names to the pick list. This is helpful when identifying and marking new formations to the displayed logs that are not in the display list.

Both lists provide a legend that allows the lines displayed over the well logs to be identified with the corresponding name of a formation. For example, the formation SLAVPT is listed in both the pick list and the display list and is indicated as a dotted line. On the well logs, a dotted line is shown at about the middle of the displayed portion of the log. This formation is labeled as SLAVPT. The other two formations are displayed on the well logs similarly. The legends can take any form. While different line types are shown here, different colors, different animations, and other different styles can be used.

As in FIG. 4, the well logs 221, 223 are arranged vertically by depth and only a portion of the depth of the well is displayed. There are three formations indicated on the logs, MUSKWA 225, SLAVPT 227, and BEAVERHL 229. In the example of this display, the formations can be retrieved from previously stored data and then indicated on the correlation window display. Typically, electronic well logs include or are associated with other data. This data not only characterizes the well with the kind of information indicated in the title bar for each log but also includes other features linked to the log by depth.

Accordingly, for both wells, the MUSKWA formation is indicated as having a top at 2266.81 m on the left log and 2293.13 on the left log. The SLAVPT well is indicated as having a depth at 2316.74 m on the left log and 2442.64 on the right log. The BEAVERHL formation is indicated as having a depth at 2395.70 m for the log on the right but there is no information about that formation for the log on the left and so, as indicated in the diagram, no information is shown.

Considering the formations more carefully, the annotation for each formation includes "<U>." In the illustrated example, this indicates that the formation was added to the logs by the user. In the examples of FIGS. 1-6, the annotations includes "<S>." This indicates that the formation was placed there by the system. These examples show that embodiments of the present invention allow the system to retrieve data about formation and show them on the logs. It also allows users to annotate and mark logs with formations as they choose. In FIG. 8, while the three formations shown on the logs are available as system information in the logs of FIGS. 1-6, they have been added by a user in FIG. 8.

The correlation window 131 allows a user to analyze logs and add annotation and marks to the logs. These can be saved for future use and reference. The formation marks of FIG. 8 can be added by selecting a formation from the pick list and then selecting a depth on either log. The selections can be made by clicking a mouse or in any of a variety of other ways. In FIG. 8, a new user-added formation is identified as BEAVERHL 229. This formation is shown in the pick list and in the display list, but is shown only in one log. The user can add this formation to the other log by marking a position on the other log which will automatically be identified as the BEAVERHL formation. In another embodiment, if the system is unable to automatically identify the formation, the user can select BEAVERHL from the pick list and then apply that selection to a selected depth.

In a typical well log, there can be very many formations and the names may be difficult to remember or distinguish. Accordingly, the system is able to aid a user in identifying and labeling logs. First, the pick list is sorted in order of depth. As can be seen in the pick list of FIG. 8, BEAVERHL is between MUSKWA and SLAVPT formations. This order is depth order so that MUSKWA is above or less deep than BEAVERHL. The same relationship appears in the well log 223 on the right side of the correlation window. Formations typically occur in the same depth order throughout a well pool, but not always. Geological events can result in folds and inversions and any one formation may or may not occur throughout a field.

Figure 9:
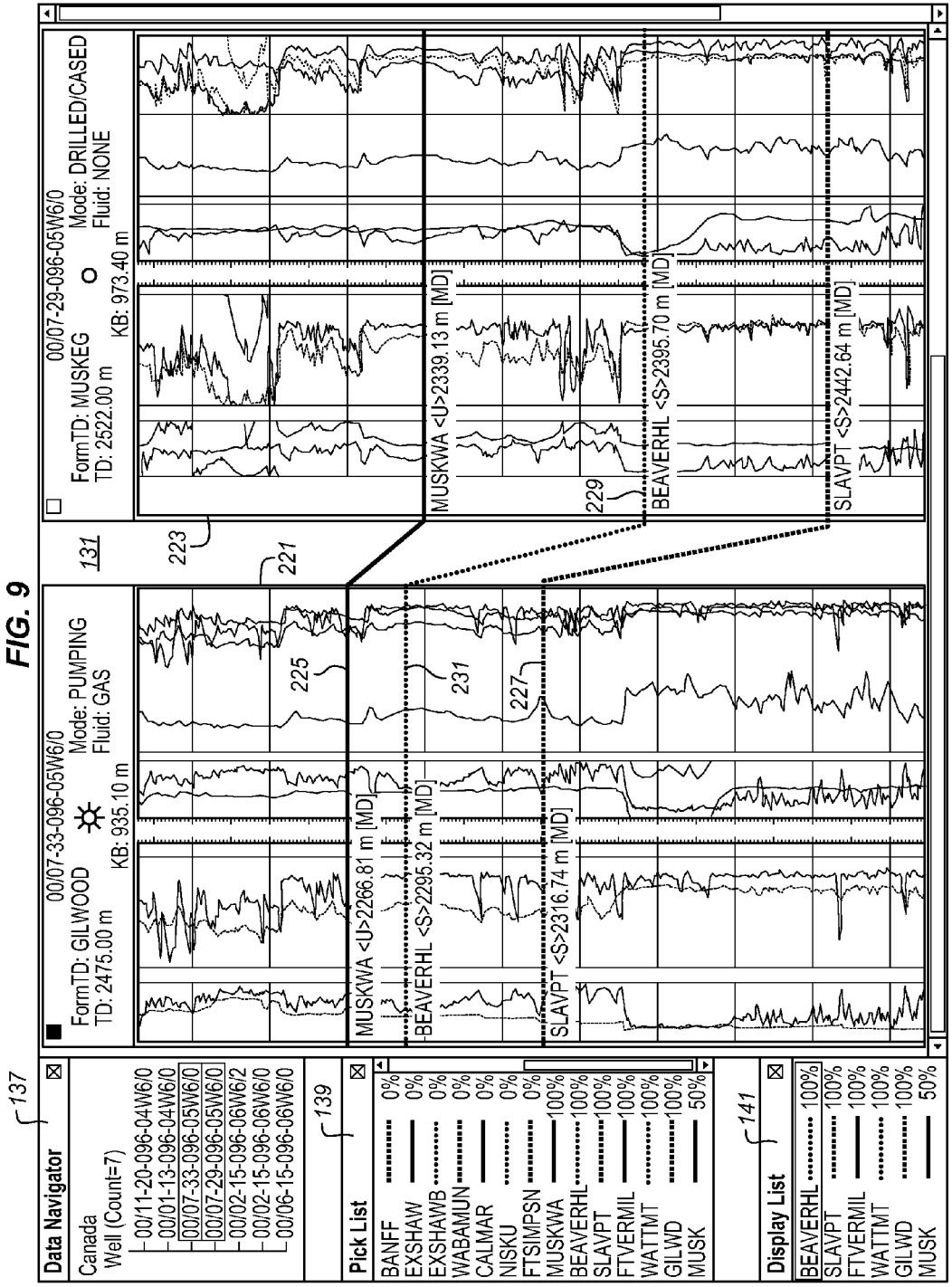
FIG. 9 is an example of a correlation window as displayed on a computer system with a proposed name for a formation top according to an embodiment of the invention.

FIG. 9 shows a proposed mark 231 for the BEAVERHL formation 229 on the left side log 221 in the correlation window 131. In one example, the system follows the user's mouse movements or the movement of a cursor by any other type of pointing device. When the cursor is moved to the left side log, the system determines that the mouse is in a position between two marked formations, in this case MUSKWA and SLAVPT. It then determines that the BEAVERHL formation is between these two other formations. It then provides a proposed mark 231 on the left side log and connects it to the BEAVERHL formation on the right side log 223.

This provides several user benefits. First, if the user agrees with the system suggestion, the user can simple confirm the suggestion with the click. The user is not required to select a formation from the pick list or even to know which formation is most likely to be in the selected area. Second, it connects the suggested marker on one log with the confirmed mark on the other log. The user can quickly go to the marker on the other log, compare the two logs and decide whether the selected marker is likely to be the top for the same formation as in the other log. The user can then adjust the position of the suggested marker, if desired, and then confirm the choice. If there is no clear position for the top, then the user can reject the suggestion and select a different formation from the pick list or move on to another part of the log.

In the example of FIG. 9, in an actual working system, the proposed mark 231 for BEAVERHL will move with the cursor. In one example, the line will follow the user's mouse. As the mouse is moved, the depth of the indicated mark will move. If the user moves the cursor outside of the space between the two formations, then the system will make another prediction. For example, if the user were to move the cursor above the MUSKWA formation 225, the system would follow the cursor and show a new proposed mark as a suggested position of the FTSIMPSON formation. This is the next formation up in the pick list. If, on the contrary, FTSIMPSON were already marked on the right side log, then the system would make no suggestion. In the case of no suggestion, the system can show a horizontal line at the depth corresponding to the position of the cursor, similar to the horizontal line 231. This mark can then be left unnamed and unconnected to any formation on the left side log.

The prediction of a formation top position does not require that two logs be displayed side by side. The suggested mark 231 of FIG. 9 can be generated without reference to the well log on the right. The suggestion can be made as a function of only the current marked formation tops and the positions of the formations in the pick list. A user can use the right side log for comparison and to help with identifying a formation. As mentioned above, any well log can be used for this purpose and the user can replace the right side well log with one or more other logs to aid in selecting tops and selection formation names.

Figure 10:
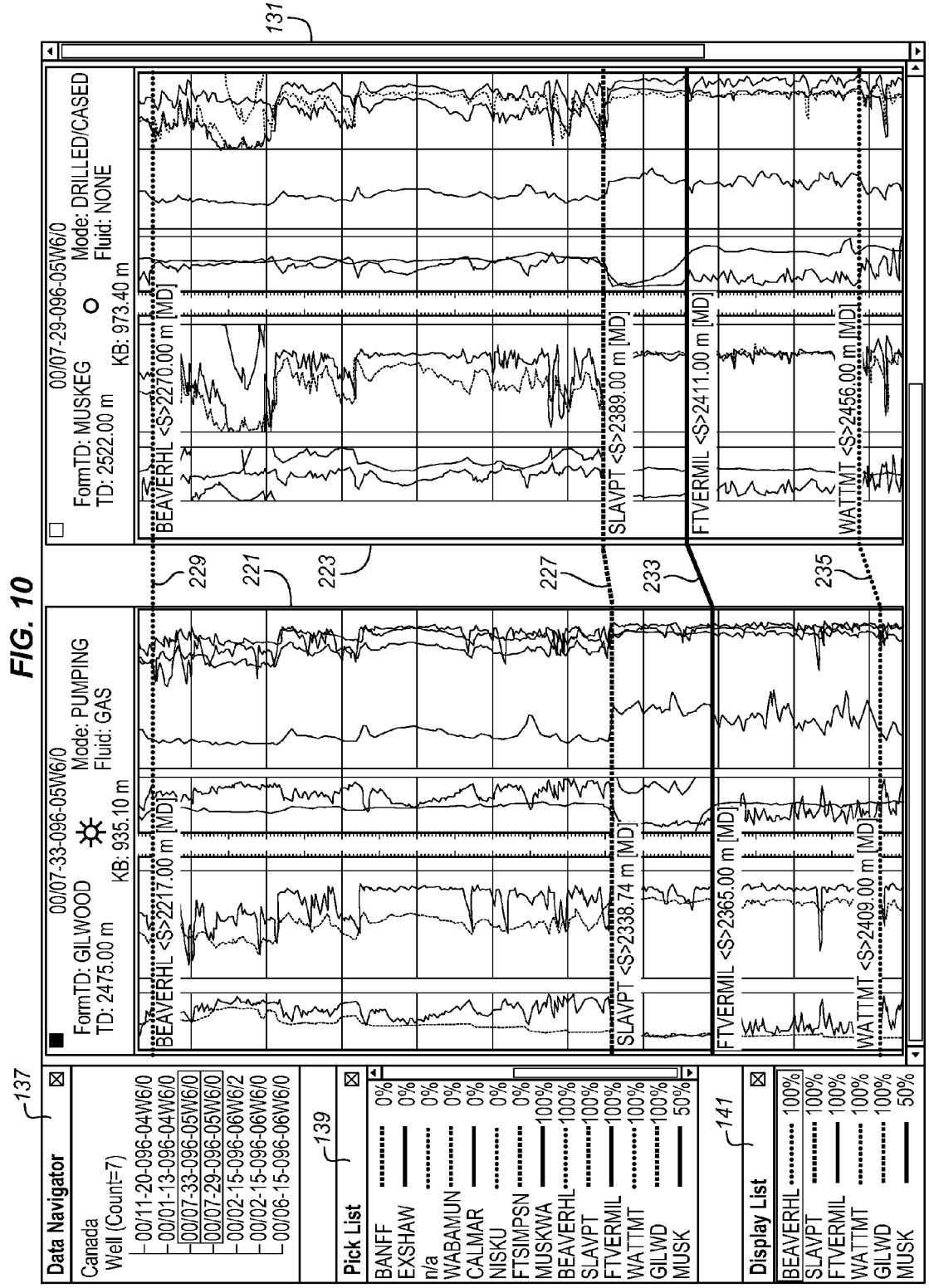
FIG. 10 is an example of a correlation window as displayed on a computer system with a proposed formation top name added according to an embodiment of the invention.

FIG. 10 shows a possible result when the user has confirmed a suggested mark for the BEAVERHL formation. In FIG. 10, the same two well logs 221, 223 are shown in the correlation window 131. The displayed depth is increased so that now the BEAVERHL formation is at the top of the display. However, as shown, the BEAVERHL formation top is indicated on both logs and the two positions are connected through the correlation window between the two logs. Such a result can be obtained from the display of FIG. 9 when the user upon being satisfied with a suggestion from the system confirms the suggestion with a mouse click or similar user input.

FIG. 10 shows that the user can also adjust the position of the logs by dragging the logs in one direction or another. The BEAVERHL formation top, for example is at 2217.00 m on the left log, but at 2270.00 m on the right log. While the mark is aligned horizontally between the two wells, the corresponding depths on the wells are different. The left side log is about 53 m higher than the right side log. The user can align the logs by grabbing and moving or by dragging or by any of a number of other user inputs. The system then can move the logs vertically on the display.

In both FIGS. 9 and 10, the formations do not line up at exactly the same indicated depth. This may be because the formations tops are higher or lower in different places or because different references or standards are used to determine depth, e.g. surface of the hole, sea level, etc.

Figure 11:
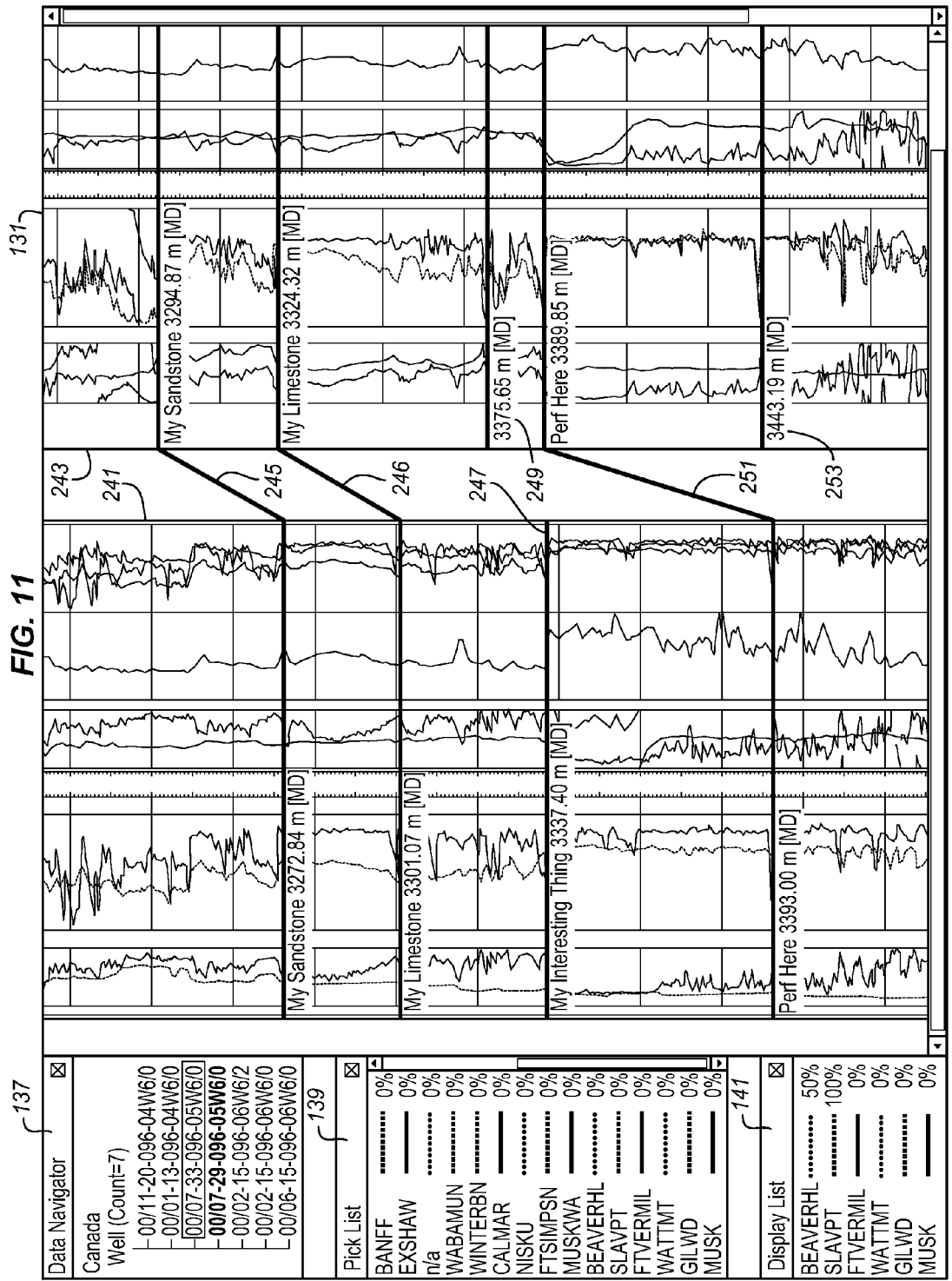
FIG. 11 is an example of a correlation window as displayed on a computer system with marked and annotated well log features according to an embodiment of the invention.

FIG. 11 shows the correlation window 131 with the same two well logs 241, 243 as in FIGS. 9 and 10. However, the logs are at a different depth in the hole than in the previous examples. In this area of the well logs, the formation tops have not been identified. FIG. 11 illustrates how the well logs can be marked and annotated. The user has identified an interesting part of the left side log at 3272.84 m and marked it 245. A similar looking portion of the right side log has also been marked. This has been annotated as My Sandstone. While the system may suggest existing formation names as in FIG. 9 for the indicated marks, the user can reject these names and provide his own. "My Sandstone" can serve as a temporary indication of what the formation might consist of. The user can later match this up to a known formation name. In one embodiment the user selects a name from the pick list 139 or the display list 141 and assigns it to the mark. Alternatively, the marks may correspond to new, previously unknown formations. These can be named later in some other way.

Similarly, the user has identified other interesting areas as My Limestone 246, My Interesting Thing 247, and Perf Here 251. Additional depths are marked on the right side formation at 3375.65 m deep 249 and at 3443.19 m deep 253. There are no corresponding marks on the left side log. This may be because the user has yet to identify a corresponding area on the left side log or because these marks do not correspond to a formation but to some other aspect of the hole or its exploration or development that the user would like to note.

FIG. 11 shows the flexibility within the system of finding areas of interest in a log, marking it and matching that area with another log. The marks can be annotated temporarily or permanently. By providing the pick list beside the logs, the user can easily assign the appropriate formation name to a particular depth. In the example of FIGS. 9 and 10, the user can assent to the system's suggestion, or the user can select and assign his own name. Formations with the same name can be matched across the different logs and this aids in a comparison of the logs at the related depths.

Figure 12:
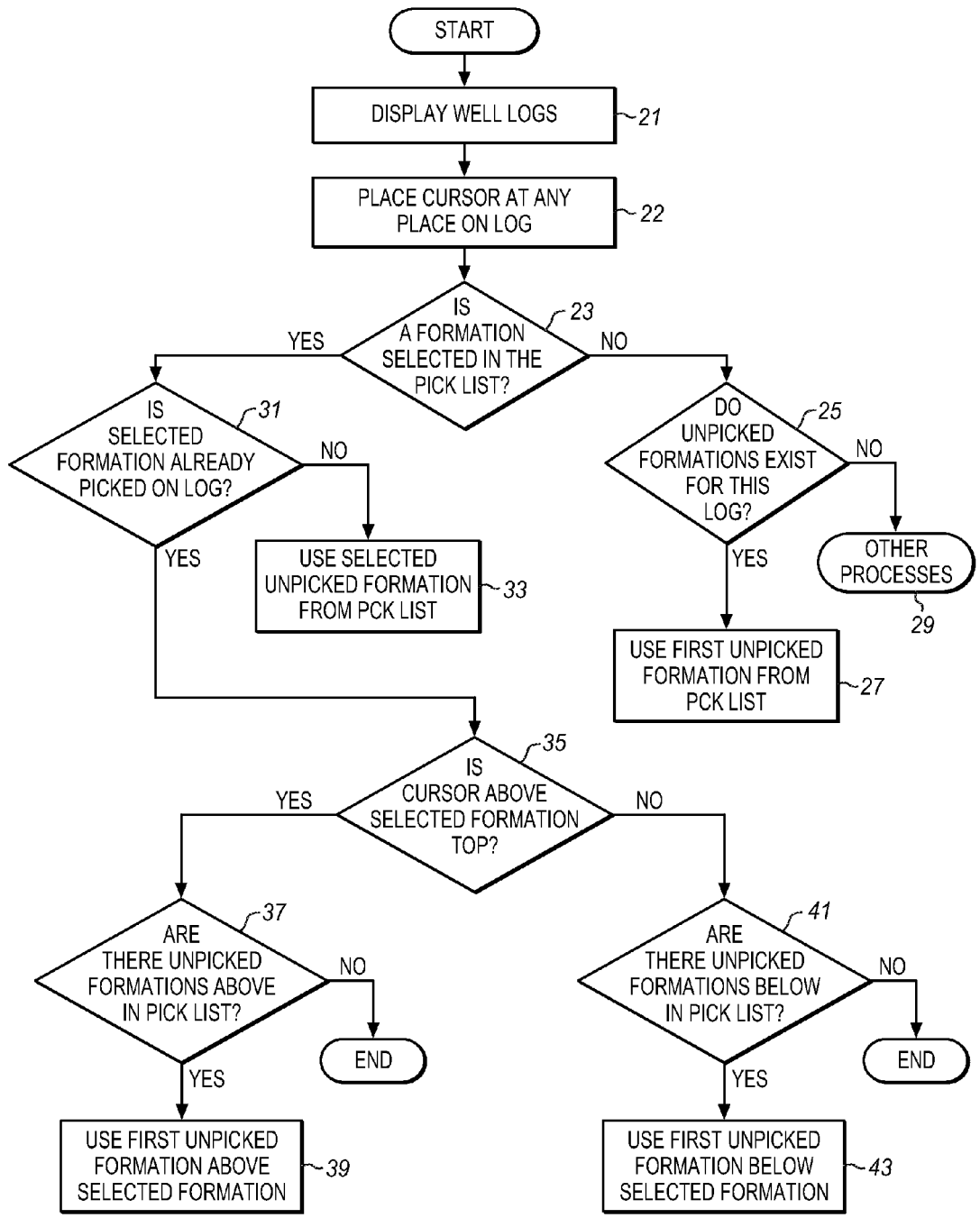
FIG. 12 is a flow diagram of proposing formation top names according to an embodiment of the invention.

FIG. 12 is a process flow diagram of identifying and naming formation tops as described in the context of FIGS. 9, 10, and 11. At block 21, well logs are displayed as shown, for example in FIG. 9. The system then monitors user inputs. If the user places a cursor or indicator at a particular depth on a log, then the system determines that depth at block 22. The system can then display a mark at the determined depth. This is shown, for example, as the mark 231 in FIG. 9.

To find a name for the indicated mark, the system first determines whether the user has selected a formation name in the pick list 139 at block 23. If so, then at block 31, the system determines whether the selected formation name from the pick list is a formation that has already been identified on the log in a different location. If this formation name has not already been assigned to some other depth, then at block 33, the selected name from the pick list is displayed on the well log as the proposed name. If the selected name from the pick list has already been used, then another process is used to determine how to propose a name for a formation top 35.

Returning to block 23 if the user has not selected a formation name from the pick list then at block 25, the system determines if there are formations in the pick list that could be picked. If so, then the system picks an unpicked formation name from the pick list at block 27. If there are no other unpicked formation names in the pick list then no formation top name is suggested and at block 29, the user can turn to other processes to name, annotate, correlate, or identify formation tops. In this context, an unpicked formation suggests a formation that has not already been identified in the well log and assigned to a particular depth. In such a case, the formation is available to be assigned to any depth that the user may choose.

Returning to block 35, if the formation selected by the user already appears on the well log at block 31, then the system can still select a formation name to propose. The system can begin at block 35 by determining whether the cursor is above or below a formation top that has already been named. If the cursor is above a formation top then at block 37 if there are unpicked formations above that top, the system can use the next formation above that formation as the proposed name at block 39. If there are no more formation names above that formation top then no formation name is selected and the process returns to wait for a new cursor position at block 22 or the user can turn to other processes 29.

Similarly if the cursor is below a formation top at block 35, then at block 41 the system can determine whether there are unpicked formations in the pick list below that formation. If so then the first unpicked formation can be selected at block 43 as the proposed name. If there are no unpicked formations below that formation, then the process ends. The system can return to block 22 to determine new cursor position or the user can invoke other processes 29.

In one embodiment, the processes of FIG. 12, result in a smooth and refined user experience and workflow that improves the ease of assigning and correlating formation names on displayed well logs. In one mode, the user selects a formation from the pick list and then moves the cursor over the log. The system then displays a mark, such as the horizontal mark 231 of FIG. 9 that follows the cursor, displays the selected name and draws a line to connect that mark to the corresponding formation top on any other displayed well log for which that formation has been identified. This allows the user to easily compare the logs to determine if the same formation is present in both.

In another mode, the user starts at a named formation top on a log. By moving the cursor up, a mark is displayed that follows the cursor movement. If there is an available formation name for a formation above the starting formation, then that name is displayed. As in the other case, the system also connects that mark to the formation of the same name on any of the other displayed well logs. Alternatively, the user can move the cursor down from the starting formation. A mark is again displayed and the if there is an available formation name below the starting formation, then that name is displayed together with the connection to the same formation in the other logs.

The user can, accordingly, use cursor movements around the well logs to see different formation suggestions and see how those formation tops compare to already established formation tops in other wells. The user can also use the pick list to look at other correlations. The operations starting at block 23 mean that among other things, any formation can be selected from the pick list. The system determines if the selection is valid or not.

In response to any proposed name, the user can confirm the selected name using an appropriate command such as a click, a double click, selecting from a contextual menu, using a keystroke, etc.

In the example of FIG. 12, the nearby formation names are selected at blocks 27, 33, 39, and 43 by reference to the pick list. The pick list will typically have all of the available formation names and can include some additional ones that the user has defined. However, the nearby formation can be selected in a variety of different ways depending on the particular application. In one example, the system retrieves the name of the formation directly above the selected depth and then refers to the pick list to choose the next formation down in the list. Alternatively, the system can retrieve the name of the formation directly below the selected depth and then select the next formation up in the pick list. In a further improvement, if the selected formation name has already been assigned to a particular depth, then the system can skip that name and choose the next name. Alternatively, it can indicate a placeholder or no name.

Alternatively, to further improve the suggested formation name, the system can retrieve formation names at depths both above and below the selected depth, select the closest formation and then select the next name up or down in the pick list. If a formation above the selected depth is closer, then the system can choose the name of the next formation down in the pick list. If a formation below the selected depth is closer, then the system can select the name of the next formation up in the list.

As a further alternative, the system can consider formation names in neighboring well logs that are between named formations or are at the selected depth. A variety of different methods can be used to propose a formation name at a selected depth. In any event, the user can exercise the choice of using the propose name, selecting a different name from a list or providing a new name. As indicated in FIG. 11, other annotations can also be used instead of a name. This allows the user to annotate items in the well logs that are not formation tops and it allows the user to mark formations without knowing an established name for the formation.

Figure 13:
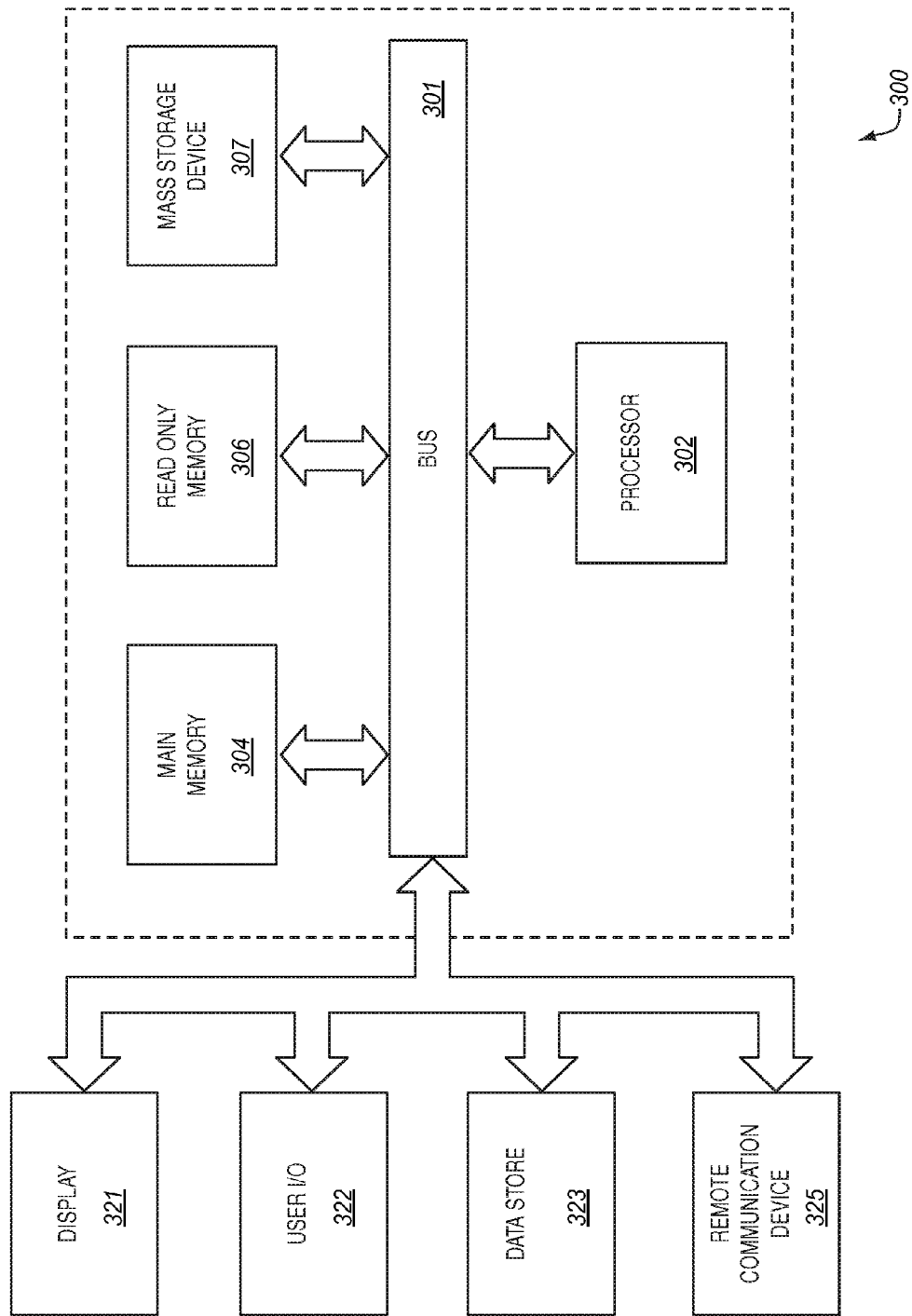
FIG. 13 is a block diagram of an example computer system suitable for implementing embodiments of the present invention.

FIG. 13 is an example of a computer system upon which embodiments of the present invention may be implemented. The computer system 300 comprises a bus or other communication means 301 for communicating information, and a processing means such as a processor 302 coupled with the bus 301 for processing information. A random access memory (RAM) or other dynamic storage device 304 (referred to as main memory), coupled to the bus 301 stores information and instructions to be executed by the processor 302. A read only memory (ROM) or other static storage device 306 is coupled to the bus 301 for storing static information and instructions for the processor 302. A mass storage device 307 such as a magnetic, optical, or solid-state disk is coupled to the bus storing information and instructions.

The bus 301 also provides connections to external devices such as a display device 321 for displaying information as presented in the above figures to an end user. Typically, an alphanumeric input device, such as a keyboard, mouse, touchpad, number pad, or stylus pad 322 to allow the user to send the commands discussed above. The user input/output devices can also include voice or gesture recognition devices. The bus 301 also provides connection to a remote data store. This data store may be an independently provided source or well logs, maps and other relevant data for use by the system 300. The remote data can be combined with data stored locally 307 to generate the displays described above. Similarly local or remote data storage may be used to store the marks and annotation that are added by the user as described above.

A remote communication device 325 is also coupled to the bus 301. The communication device 325 may include a modem, a network interface card, or other well-known wired or wireless interface devices, such as those used for coupling to Ethernet, token ring, or other types of physical attachment for purposes of providing a communication link to support a local or wide area network, for example. In this manner, the computer system 300 may be coupled to a number of clients or servers via a conventional network infrastructure, such as a company's Intranet or the Internet, for example. The system may obtain some or all of the log and map data remotely through the communication device. The data may be combined with data in one or more other stored locations.

It is appreciated that a lesser or more equipped computer system than the example described above may be desirable for certain implementations. Therefore, the configuration of the system will vary from implementation to implementation depending upon numerous factors, such as price constraints, performance requirements, technological improvements, and/or other circumstances.

It should be noted that, while the steps described herein may be performed under the control of a programmed processor, such as processor 302, in alternative embodiments, the steps may be fully or partially implemented by any programmable or hardcoded logic, such as Field Programmable Gate Arrays (FPGAs), TTL logic, or Application Specific Integrated Circuits (ASICs), for example. Additionally, the method of the present invention may be performed by any combination of programmed general purpose computer components and/or custom hardware components. Therefore, nothing disclosed herein should be construed as limiting the present invention to a specific combination of hardware components.

While the steps described herein can be performed under the control of a programmed processor, such as the processor 702, in alternative embodiments, the steps can be fully or partially implemented by any programmable or hard coded logic, such as Field Programmable Gate Arrays (FPGAs), TTL logic, or Application Specific Integrated Circuits (ASICs), for example. Additionally, the method of the present invention can be performed by any combination of programmed general purpose computer components or custom hardware components. Therefore, nothing disclosed herein should be construed as limiting the present invention to a particular embodiment wherein the recited steps are performed by a specific combination of hardware components.

The present description presents the examples using particular terms, such as mouse, cursor, pick list, display list, mark, and annotation. These terms are used to provide consistent, clear examples, however, the present invention is not limited to any particular terminology.

Similar ideas, principles, methods, apparatus, and systems can be developed using different terminology in whole, or in part. In addition, the present invention can be applied to ideas, principles, methods, apparatus, and systems that are developed around different usage models and hardware configurations.

The present invention is described in terms of gas wells and fields. However, a wide range of different types of well logs covering any type of logged hole operated on using the present invention.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

The present invention includes various steps, which can be performed by hardware components or can be embodied in machine-executable instructions, such as software or firmware instructions. The machine-executable instructions can be used to cause a general-purpose or special-purpose processor programmed with the instructions to perform the steps. Alternatively, the steps can be performed by a combination of hardware and software.

The present invention can be provided as a computer program product that can include a machine-readable medium having stored instructions thereon, which can be used to program a computer (or other machine) to perform a process according to the present invention. The machine-readable medium can include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising:
presenting a display of wells for which log data is available on a display device of a computing device;
receiving a selection of a first well at an input device of the computing device;
retrieving a log corresponding to the selected well and presenting the log on a display upon the display device in response to the selection;
receiving a command to pin the selected well to a log display;
marking the selected well and the corresponding log as pinned in response to the pin command;
receiving a selection of a second well;
in response to the selection of the second well, retrieving a second log corresponding to the second well and presenting the second log beside the pinned log on the display device;
moving the pinned and second logs in the display with respect to each other in response to receiving a command to float the logs;

receiving a selection of a third well;
in response to the selection of the third well, retrieving a third log corresponding to the third well and presenting the third log, in place of the pinned second log on the display device; and
moving the pinned and third logs in the display with respect to each other in response to receiving a command to float the logs.

2. The method of claim 1, wherein presenting a display of wells comprises presenting a geographical map with the wells marked by an indication of each presented well's respective location on the map.

3. The method of claim 1, wherein the third well has a position independent of the position of the second well.

4. The method of claim 1, wherein the pinned and second well logs are elongated and wherein presenting the pinned and second well logs comprises presenting the well logs side-by-side and vertically aligned.

5. The method of claim 4, wherein moving the pinned and second logs comprises moving the pinned and second logs vertically with respect to each other.

6. The method of claim 1, further comprising receiving a mark for the pinned log and recording the mark in association with a depth on the pinned log.

7. The method of claim 6, further comprising receiving a name for the mark and recording the name in association with the recorded mark.

8. The method of claim 1, further comprising removing the presentation of the second well before presenting the third well beside the pinned well.

9. A machine-readable non-transitory medium having instructions stored thereon that when operated on by the machine cause the machine to perform operations comprising:
presenting a display of wells for which log data is available;
receiving a selection of a first well;
retrieving a log corresponding to the selected well and presenting the log on a display in response to the selection;
receiving a command to pin the selected well to a log display;
marking the selected well and the corresponding log as pinned in response to the pin command;
receiving a selection of a second well;
in response to the selection of the second well, retrieving a second log corresponding to the second well and presenting the second log beside the pinned log;
moving the pinned and second logs in the display with respect to each other in response to receiving a command to float the logs;
receiving a selection of a third well;
in response to the selection of the third well, retrieving a third log corresponding to the third well and presenting the third log in place of the pinned second log; and
moving the pinned and third logs in the display with respect to each other in response to receiving a command to float the logs.

10. A method comprising:
presenting a display of a well log showing logged information and well depths corresponding to the information on a display device of a computing device;
receiving a selection of a displayed depth on the well log at an input device of the computing device;
searching the data related to the well log to find a named formation near the selected depth;
selecting a name of a formation near the named formation; and
presenting the name of the adjacent named formation on the display of the well log in association with the displayed depth upon the display device;
wherein searching data related to the well log to determine whether the selected depth corresponds to a named formation in the searched data; and
if the selected depth does not correspond to a named formation, then presenting a name from a stored list of formation names on the display of the well log in association with the selected depth.

11. The method of claim 10, further comprising receiving the stored list of formation names from a user.

12. The method of claim 10, wherein presenting a display of a well log comprises presenting a display of the well log that includes the selected formation on another log highlighted on the display.

13. The method of claim 10, wherein receiving a selection of a displayed depth comprises detecting a position of a pointing device without receiving a pointing device click.

14. The method of claim 10, wherein selecting a name comprises detecting a position of a pointing device and comparing the detected position to a displayed position of tops of named formations above and below the selected depth and selecting an adjacent formation having a top closest to the detected position.

15. The method of claim 10, further comprising presenting a second well log beside the first well log and wherein presenting a name on the display in association with the depth of the top comprises presenting the name in association with the depth of the top of the first and the second well log.

16. A machine-readable non-transitory medium having instructions stored thereon that when operated on by the machine cause the machine to perform operations comprising:
receiving a selection of a displayed depth on the well log;
searching the data related to the well log to find a named formation near the selected depth;
selecting a name of a formation near the named formation; and
presenting the name of the adjacent named formation on the display of the well log in association with the displayed depth;
wherein searching data related to the well log to determine whether the selected depth corresponds to a named formation in the searched data; and
if the selected depth does not correspond to a named formation, then presenting a name from a stored list of formation names on the display of the well log in association with the selected depth.

* * * * *